UNITED STATES PATENT OFFICE.

FRANK S. WASHBURN, OF RYE, NEW YORK, ASSIGNOR TO AMERICAN CYANAMID COMPANY, OF NEW YORK, N. Y., A CORPORATION OF MAINE.

NITROGENOUS PHOSPHATIC MATERIAL AND PROCESS OF PRODUCING THE SAME.

1,355,369.   Specification of Letters Patent.   Patented Oct. 12, 1920.

No Drawing.   Application filed July 23, 1920. Serial No. 398,551.

*To all whom it may concern:*

Be it known that I, FRANK S. WASHBURN, a citizen of the United States, residing at Rye, in the county of Westchester and State of New York, have invented certain new and useful Improvements in Nitrogenous Phosphatic Material and Processes of Producing the Same; and I do hereby declare the following to be a full, clear, and exact description of the invention, such as will enable others skilled in the art to which it appertains to make and use the same.

This invention relates to a new nitrogenous phosphatic material and process of making the same from lime nitrogen or crude calcium cyanamid and phosphoric acid and has for its object to accomplish this result in a cheap and satisfactory manner while improving the methods heretofore proposed.

With these and other objects in view the invention consists in the novel steps and combination of steps constituting the process and in the novel composition of matter constituting the product all as will be more fully hereinafter disclosed and particularly pointed out in the claims.

In order that the precise invention may be more clearly understood it is said:

I am familiar with United States Patent #988,894 for treating lime nitrogen with phosphoric acid. The process as disclosed in said patent has the disadvantage of requiring sufficient acid to neutralize the large quantity of lime present in the lime nitrogen. It therefore results in a compound of relatively small nitrogen content; and it is also uneconomical for it involves first the separation of the phosphoric acid from the lime in the phosphate rock and subsequently the neutralization of said acid with lime from the lime nitrogen.

In the various processes for producing compounds containing phosphate of ammonia, as for instance, the procedure disclosed in my U. S. application No. 365,183 filed March 12, 1920, and entitled New fertilizer and process of producing the same, I must first convert the lime nitrogen into ammonia and then treat an acid mixture containing phosphoric acid with the ammonia thus produced. This of course involves the use of a great deal of special equipment in which to carry out the reactions.

In this invention on the other hand, I prepare a solution of lime nitrogen and water and by filtration remove from said solution the insoluble materials consisting chiefly of lime and carbon residues. In this way, I prevent the formation of calcium phosphate in the final product and thus save $P_2O_5$ for neutralization with ammonia. In making up this solution I preferably use warm water and allow the solution before filtering to stand long enough to obtain an efficient extract of the nitrogen contained in the lime nitrogen while precipitating or leaving the insoluble combined calcium behind. I then treat this extracted solution with phosphoric acid until upon continued heating the reaction between the nitrogenous matter and the phosphoric acid is substantially complete. In order to obtain a dry and crystalline product, I may then evaporate this solution until the solids begin to crystallize out, allow the mixture to cool and remove the crystals. Upon analysis I find these crystals to contain roughly say 27% of nitrogen and approximately 31% of $P_2O_5$. The products formed in this way are soluble in water.

In practice I prefer to so proportion my lime nitrogen extract produced as above disclosed and crude phosphoric acid as to obtain a mixture containing approximately 28 parts of nitrogen to $35\frac{1}{2}$ parts of $P_2O_5$, or a slight excess of $P_2O_5$ above that theoretically required. In the case where I use an excess of $P_2O_5$ as phosphoric acid, I preferably neutralize this excess acid with ammonia after the reaction between the lime nitrogen extract and phosphoric acid is complete, and before concentrating to recover the final product. I find that by this final neutralization with ammonia, I am enabled to materially increase the percentage of nitrogen in my final product. By working in these acid solutions the reaction proceeds more rapidly and also by neutralizing the excess acid with ammonia I can obtain a neutral final product. This is an advantage, for if the final product is acid it will naturally destroy the bags or other shipping container, a result to be avoided in any fertilizer material. On the other hand, if said final product is alkaline under certain conditions of temperature, it will lose nitrogen, and since this is a valuable ingredient, it is equally undesirable; for said product to be alkaline. It is therefore an important feature of this invention that I finally neutralize the solution with ammonia in case it is acid at the end of the reaction.

I also find that I can concentrate my lime nitrogen extract before treating it with phosphoric acid and subsequently treat this concentrated solution with phosphoric acid in the same manner as above. Or I can even concentrate this lime nitrogen extract and remove the solid crystalline material thus formed and then treat this crystalline material or a solution of this crystalline material with phosphoric acid as described above. In any event the nature and composition of the final product is not substantially altered.

The final product appears to be made up in part of a complex compound of urea and phosphoric acid. Since, however, in the making of ordinary urea from lime nitrogen a very different procedure must be followed and since if the process heretofore disclosed is followed out, the product shows only minute quantities of said ordinary urea, I can but conclude that the product herein disclosed is some complex form of urea.

It can readily be seen that I may widely vary the percentage of nitrogen, or ammonia, and $P_2O_5$ in the final product by varying the amount of lime nitrogen extract to be added to a given amount of phosphoric acid and in this way necessitate the addition of greater or less quantities of ammonia to neutralize the excess of phosphoric acid present. In fact I have prepared by this method mixtures or products containing from 20% to 40% nitrogen and from 40% to 20% $P_2O_5$. It is also obvious that although such a product can be used as a fertilizer material, it can also be used for many other purposes, to which such a compound is applicable.

Among the advantages that flow from this procedure are the following: First, I am enabled to prepare a material containing high percentages of ammonia and phosphoric acid. Second, by displacing a certain amount of the lime nitrogen extract with ammonia, I am able to vary the percentage of the final product as desired. Third, I am able to prepare directly from lime nitrogen and phosphoric acid by a cheap and simple method, a very high grade fertilizer material. Fourth, to carry out this process only a very simple equipment is required. Fifth, in the above process I use less phosphoric acid than is required to treat the dry lime nitrogen directly.

In addition to the above by first extracting lime nitrogen with water and concentrating this extract, I am enabled to transport the combined nitrogen to the point of production of the phosphoric acid without carrying along the inert portions of the lime nitrogen, and thus save materially in the cost of shipping.

It is obvious that those skilled in the art may vary the details of the procedure without substantially departing from the spirit of my invention and I, therefore, do not wish to be limited to the above disclosure except as may be required by the claims.

What is claimed is:

1. The process of preparing a material containing phosphoric acid and combined nitrogen which consists in treating lime nitrogen or crude calcium cyanamid with water, and treating the solution thus formed with phosphoric acid, substantially as described.

2. The process of preparing a material containing phosphoric acid and combined nitrogen which consists in treating lime nitrogen, or crude calcium cyanamid with water; substantially eliminating the combined calcium in the lime nitrogen; treating the solution thus obtained with phosphoric acid; and concentrating said mixture to collect said material substantially as described.

3. The process of preparing a material containing substantial quantities of combined nitrogen and phosphoric acid which consists in extracting crude calcium cyanamid with hot water; removing the insoluble matter from said extract; treating said extract with phosphoric acid; and concentrating said solution to recover said material, substantially as described.

4. The process of preparing a material suitable for fertilizing purposes, which consist in extracting crude calcium cyanamid with hot water; removing the insoluble material from said extract; treating said extract with phosphoric acid; heating and concentrating said mixture to remove a portion of the water present; and recovering the product thus produced; substantially as described.

5. The process of producing a material containing phosphoric acid and nitrogen which consists in extracting crude calcium cyanamid with water; removing the insoluble material from the solution; concentrating said solution to recover a substantially crystalline material; treating said crystalline product with phosphoric acid and water; and concentrating said mixture to recover the product substantially as described.

6. The process of producing a material containing phosphoric acid and nitrogen which consists in treating lime nitrogen with water to produce a solution; treating said solution with an excess of phosphoric acid; heating said acid mixture; and substantially neutralizing said acid mixture with ammonia; substantially as described.

7. The process of producing a material containing phosphoric acid and nitrogen which consists in treating lime nitrogen with water to produce a solution; treating said solution with an excess of phosphoric acid; heating said acid mixture; substantially neutralizing said acid mixture with ammonia; and concentrating the neutral mixture thus obtained to recover the product; substantially as described.

8. The process of producing a material which consists in extracting crude calcium cyanamid with hot water; removing the insoluble matter from said extract; treating said extract with an excess of phosphoric acid with continued heating until the reaction is substantially complete; substantially neutralizing said acid mixture with ammonia; and concentrating the said neutral solution to recover said material, substantially as described.

9. The process of preparing a nitrogenous composition of matter which consists in extracting lime nitrogen, or crude calcium cyanamid, with water; removing the insoluble material from said extract; concentrating said extract to produce substantially a crystalline product; treating said crystalline product with an excess of phosphoric acid and water with continued heating until the reaction is substantially complete; substantially neutralizing said acid solution with ammonia; concentrating said neutral solution; and recovering the product, substantially as described.

10. The herein described new composition of matter containing substantial quantities of phosphoric acid and substantial quantities of nitrogen in the form of a complex urea compound, substantially as described.

11. The herein described new composition of matter containing between 20% and 40% phosphorus pentoxid and between 20% and 40%, combined nitrogen, a substantial part of said nitrogen being in the form of complex urea compounds, substantially as described.

In testimony whereof I affix my signature.

FRANK S. WASHBURN.